Patented Aug. 24, 1926.

1,597,059

UNITED STATES PATENT OFFICE.

ALFRED A. CRIMP, OF CHICAGO, ILLINOIS.

PROCESS OF MAKING BEARING MATERIAL.

No Drawing.   Application filed October 1, 1924. Serial No. 741,059.

The present invention relates to improvements in processes of making bearing material.

It has long been recognized as desirable to incorporate graphite or other lubricating material into bearing members, and various processes have been suggested for accomplishing the more or less intimate distribution of lubricating material throughout the bearing metal. In so far as applicant is aware, however, such processes have failed to achieve the result desired, serious difficulties having been encountered due to the very great difference in specific weight in the bearing metal and in the lubricating material.

An object of the present invention is to provide a process whereby commercial lubricating material, such as graphite, may be uniformly disposed throughout the mass of the bearing metal.

A further object is to provide a method for incorporating lubricating material uniformly and permanently throughout the mass of bearing metal.

A further object is to provide a process for causing the uniform distribution of lubricating material through bearing metal, which process will be simple and inexpensive to practice.

A further object is to provide a process of disposing lubricating material uniformly through the mass of bearing metal which uniform distribution will be permanently maintained regardless of subsequent meltings and pourings.

A further object is to provide a process of treating bearing metal which will render same self-lubricating, which will harden said metal and which will raise the melting point thereof.

A further object is to provide a bearing material which will have improved lubricating qualities, improved hardness and improved lasting qualities over bearing material as heretofore known and used.

Further objects will appear as the description proceeds.

The present invention contemplates the use of any of the well known bearing metals, such, for example, as bronze, brass, copper, Babbitt metal or other bearing metal. The problem which has confronted applicant and which experiments show has been successfully solved is to cause the uniform distribution throughout the mass of such bearing metal of lubricating material. According to applicant's best information at the present time, the preferred lubricating material for best results is flake graphite, though it will be understood as the description proceeds that the invention is not limited to flake graphite but is applicable to other carbon lubricants or lubricants of other materials.

According to the present invention, flake graphite is mixed with saltpeter, which saltpeter may, for purposes of convenience, be referred to herein as a fluxing agent. Experiments have shown that the process of the present invention is improved if, in addition to the saltpeter, pulverized resin is used, though the use of the resin is not essential. In carrying out the present invention the portions of bearing metal, saltpeter, flake graphite and pulverized resin may be varied throughout a wide range. Proportions which have proven successful are as follows: For each pound of bearing metal, such as Babbitt metal, a mixture is used consisting of approximately one-half ounce of saltpeter, one-quarter ounce of flake graphite and one-quarter ounce of pulverized resin. Applicant has made no experiments with iron or steel, which materials are sometimes used as bearings, and therefore makes no claim to such bearings.

In carrying out the present invention the bearing metal, such, for example, as Babbitt metal, may be melted and the mixture of saltpeter and flake graphite or the mixture of saltpeter, flake graphite and pulverized resin is poured upon said molten bearing metal. After the resulting flare has subsided, the residue upon the top of the molten metal is removed and the molten metal is thoroughly agitated to cause the uniform distribution therethrough of the graphite or other lubricant which may have been used. By reason of the chemical action, the nature of which can only be conjectured at the present time, the graphite of the mixture seems to be so affected that instead of rising to the top of the molten Babbitt metal or other metal, said graphite remains distributed throughout the mass of said Babbitt or other metal. Experiments indicate that no particular precautions need be observed in the step of cooling the molten mass. Upon remelting and pouring, the graphite or other lubricant will remain uniformly distributed through the mass and will constitute a permanent lubricating part of the lubricating material.

Experiments show that bearing metal treated according to the present method has increased hardness, whereby its usefulness is improved and its life as a bearing metal is increased. Moreover, the bearing metal treated according to the present invention has a higher melting temperature than untreated bearing metal, thereby rendering bearing metal treated according to the present invention less liable to failure in heavy service.

In service wherein it is considered necessary and desirable to use a lubricating oil upon the bearing material, the cheapest grade of oil will suffice to lubricate bearings prepared according to the present process. Economy of operation is therefore very greatly promoted.

It will be understood, of course, that the proportions of the materials defined above are merely illustrative in their nature. The preferred proportions for any grade of bearing metal and the other materials referred to may be readily determined by experimentation. It will be understood, also, that the step of agitating the molten bearing metal to effect the uniform distribution of the graphite therethrough may occur either before or after the removal of the residue from the top surface of the molten mass.

Though a preferred embodiment of the present invention has been described in detail, it will be clear that many modifications will occur to those skilled in the art. It is intended to cover all such modifications that fall within the scope of the appended claims.

What is claimed is:

1. The process of impregnating bearing metal with graphite which consists of providing molten bearing metal and applying thereto graphite and saltpeter.

2. The process of impregnating bearing metal with graphite which consists in providing molten bearing metal and applying thereto graphite, saltpeter and resin.

3. The process of impregnating bearing metal with lubricating material of the nature of graphite which consists in mixing said lubricating material with saltpeter and applying same to said bearing metal while said bearing metal is in a molten state.

4. The process of impregnating bearing metal with a lubricating material of the nature of graphite which consists of mixing said lubricating material with saltpeter and resin and applying said mixture to said bearing metal while said bearing metal is in a molten state.

5. Bearing material comprising bearing metal which bearing metal is impregnated with a substance which is the result of the chemical action of saltpeter and graphite in the presence of the molten form of said bearing metal.

6. The method of treating bearing metal which consists of subjecting same to the action of flaked graphite and powdered saltpeter while said bearing metal is in a molten state.

7. The method of treating bearing metal which consists in subjecting same while in a molten state to the action of flaked graphite, saltpeter and resin.

Signed at Chicago, Illinois, this 29th day of September, 1924.

ALFRED A. CRIMP.